April 22, 1930.   E. B. WARING   1,755,853
DICTIONARY AND EDUCATIONAL GAME
Filed Dec. 14, 1927   2 Sheets-Sheet 1
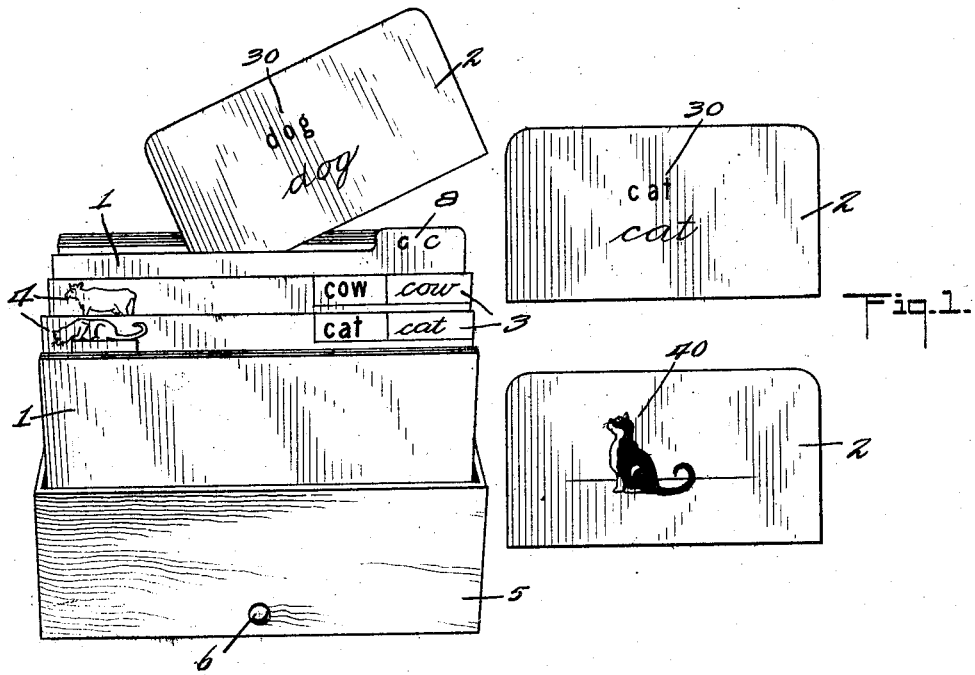
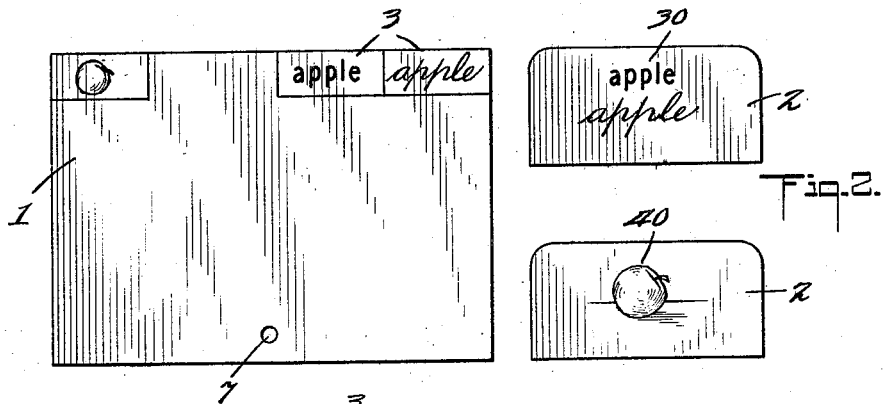
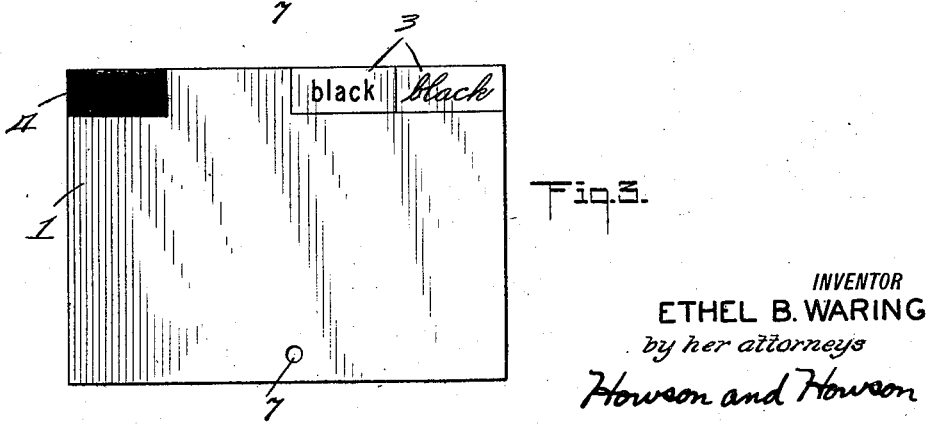
*INVENTOR*
ETHEL B. WARING
*by her attorneys*
Howson and Howson April 22, 1930.  E. B. WARING  1,755,853
DICTIONARY AND EDUCATIONAL GAME
Filed Dec. 14, 1927  2 Sheets-Sheet 2
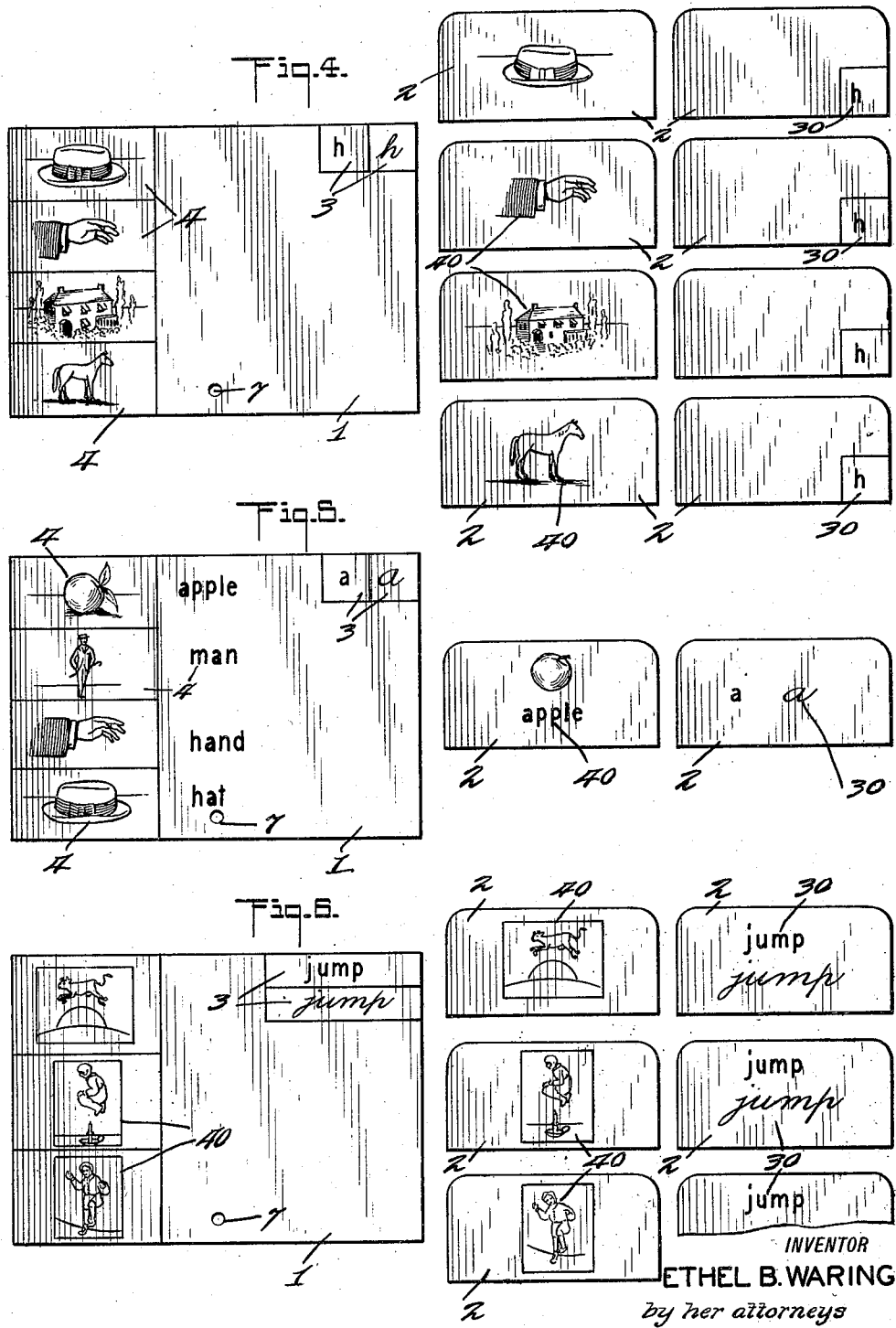
INVENTOR
ETHEL B. WARING
by her attorneys
Howson and Howson Patented Apr. 22, 1930

1,755,853

UNITED STATES PATENT OFFICE

ETHEL B. WARING, OF ITHACA, NEW YORK

DICTIONARY AND EDUCATIONAL GAME

Application filed December 14, 1927. Serial No. 239,870.

My invention relates to dictionaries particularly adaptable to use by young children of primary school age, though it can also be embodied in dictionaries for adults. Part of my invention relates also to educational game and dictionary material of the loose leaf file type.

One purpose of my invention is to provide a dictionary from which a user not skilled in reading can find the meaning of an unfamiliar word or other literary symbol, defined by means of pictures or the like.

Another purpose is to provide a dictionary and educational game device which may at first contain only a few words, but which may be enlarged by the child or his teacher, as his reading vocabulary grows.

A further purpose is to provide a dictionary which will be convenient for young children to handle, and reasonably stable, but at the same time will contain parts bearing the words and definitions, which parts may be removed from the more stable part of the dictionary and carried by the child to the blackboard or to his desk to serve as a copy for his writing or a verification of words in his reading book.

A further purpose is to familiarize the child with the contents of the dictionary by enabling him to play games with it, but to provide parts of it in duplicate, so that one complete set of words and definitions comprising the dictionary at a given time may remain constantly secured in the loose leaf file. This arrangement also makes one dictionary with a duplicate set of cards available to a large number of children simultaneously.

In the accompanying drawings which form a part of the specification and which illustrate typical cards from my dictionary:

Fig. 1 is a perspective view of a child's loose leaf dictionary file embodying my invention;

Fig. 2 illustrates two cards from the dictionary bearing a common noun and its definition. The figure shows the face of card 1 and the face and back of card 2;

Fig. 3 illustrates a similar card bearing an adjective and its definition;

Fig. 4 shows a number of similar cards bearing a letter, a consonant, and its definitions;

Fig. 5 shows a number of similar cards bearing a letter, a vowel, and its definition;

Fig. 6 shows a number of similar cards bearing an action word (a verb) and its definition, the face of one of the cards 2 being partly broken away;

I prefer to embody my invention in the form of a loose leaf file, having a set of cards 1, which I prefer to secure removably in the loose leaf file, and a set of cards 2, which I prefer not to fasten into the file, but to place loosely between the cards 1. Each card 1 bears a literary symbol, 3, that is to say a letter, syllable, word, phrase, sentence or the like. Each card 1 also bears a definition other than literary 4, of the literary symbol, that is to say, the definition may be an outline, a picture, digit, block of color or other indication or several of such indications.

Each card 2 bears a duplicate 30 of part or all of the literary symbol and a duplicate 40 of part or all of the definition other than literary, borne by one of the cards 1.

I place both the literary symbol and its definition on the same face of each card of one set; in the drawings I have shown them so placed on the set of cards marked 1. On the other set of cards I prefer to place each literary symbol on the face and its definition on the back, as shown in the cards marked 2.

The cards may be filed in any suitable container such as the box drawer 5, and one set of cards may be removably retained therein by any suitable means such as a rod 6 adapted to be threaded through a hole in the front wall of the box, through holes 7 in the cards, and screwed into the rear wall of the box. I have shown the cards 1 adapted to be so retained in the file, and the cards 2 adapted to be filed loosely between the cards 1. I prefer to file all the cards alphabetically. Alphabetical guide cards 8 may be added to the file if desired.

I find it convenient to make the cards of light weight cardboard, but the choice of material is optional. It has been my experience that a convenient size for the cards which are removably retained in the file is about seven by five inches, and for the loose cards, about seven by four inches or about six by three inches. I also prefer to round the top corners of the loose cards, as a means of indicating to the child which is the top and which is the bottom of the matter borne thereon. However, both the size and the shape of the cards are optional.

Figure 1 shows a filing box 5 containing two sets of cards, some cards being separated, so that the cards 1 of the first set bearing the words 3 "cat" and "cow" respectively and their respective pictorial definitions 4, and also an index guide card 8, show plainly. The face of a card 2 of the second set bearing the word 30, "dog", is shown in the act of being removed from or replaced in the file, and both face and back of another card 2 entirely removed from the file, is shown. This card 2 bears on its face the literary symbol 30, being the word "cat" in type and in script. On its back it bears the definition other than literary 40, that is, the picture of a cat.

In using my invention the child, on meeting an unfamiliar word in his reading or in his educational games, may look through the cards fastened in the dictionary file until he finds the same word. Then from the accompanying picture, or other definition other than literary, upon the card, he will perceive the meaning of the word.

When a young child with small reading vocabulary and unfamiliar with the alphabet begins to use my invention, the dictionary may contain only the few words which he is encountering in his reading. These will usually be few enough so that he can, without fatigue, look at each card in the file in order to find the one he desires.

At such early stages of learning one of the advantages of the loose cards is, that when the child has found the word he is looking for, he can take it to his seat or blackboard or chart to verify his reading, or to serve as a copy for his writing. It is useful to have the literary symbol appear on these cards both in printed type and in handwriting copy, but the use of either or both forms is optional.

Additional cards may be added to the dictionary either by the child or by the parent or teacher, according to the immediate aim sought.

Letting the child himself add new cards to the dictionary as he learns their contents helps to impress upon his mind the new words, and to increase his interest in and understanding of a dictionary, and of alphabetical sequence.

For example, assuming that the child uses in his reading some words which stand for the names of animals, and is about to use more such words he may be given a series of cards 1 bearing the word for and pictures of a dog, cat, pig, bear, rat, horse, goat and hen, respectively, and may be allowed to find in the file the alphabetical guide card bearing the initial letter of each word and to secure each card 1 before its proper guide card. Or an educational game may be made of the filing. These cards 1 may be divided among several children each of whom may take turns at finding the proper guide card behind which to place his card 1.

In the earlier use of the dictionary, or in introducing entirely unfamiliar words, some users may prefer to have the teacher or parent add the cards 1 to the file, and to allow the child to learn the nature of the dictionary or the meaning of the new word by giving him the corresponding cards 2 to file. The young child may file the cards 2 entirely by comparing the picture or other "definition" on the back of each card 2 with that on the face of the corresponding card 1, while the older child may file the cards through his knowledge of letters of the alphabet.

Either before or after adding a group of cards 1 to the file the children may be familiarized with the contents of the card by educational games with the cards 2. For example, with a group of animal word cards such as mentioned above, a group of children may pile all the cards in the center of the table with the picture side down, words side up. Each child in turn may draw a card and read the word. Then he may turn it over and tell by the picture whether he has read it correctly. If he is right he may keep the card; if wrong he must return it, picture side down, to the bottom of the pile. When all the cards have been drawn and correctly read, the child having the greatest number has won the game. Obviously one child alone can use the cards in a similar manner. To inject the element of competition into the play of a solitary child, he may time himself by means of a stop watch or a miniature "hour" glass, for example, to see how quickly he can correctly read all the cards. Each card 2 may then be placed in the file in front of or behind its corresponding card 1, as may be preferred.

In the case of literary symbols whose definitions are somewhat abstract, it may be considered desirable to add to the cards in addition to the definition other than literary, a literary example. This however is optional. In Figures 4 and 5, for example, which illustrate cards bearing letters of the alphabet and their defininitions, the definition other than literary is supplied by picturing a series of articles the name of each of which contains the letter being defined. The cards may, as in Fig. 4, bear only the letter to be defined, and the pictorial definition. Or, in order to impress simultaneously and more firmly upon the mind of the child the literary symbol and its sound, the written or printed names of the pictured articles may be added as illustrative examples. As stated above this addition is optional. If desired, the letter being defined may be printed in heavier type than, or in a different colored ink from the rest of the illustrative word.

In Figure 2, card 1 and its corresponding card 2 bear identical literary symbols and definitions other than literary. In Figs. 4 and 5 and some of the other figures a modification is shown in which each card 2 bears the identical literary symbol as its corresponding card 1, but bears only a part of the complete definition other than literary borne by the card 1.

An educational social game which can be played with groups of cards 2 of related significance, such as those shown in Figs. 4 and 5, is as follows. Cards 2 defining a number of letters, diagraphs and/or diphthongs, including several cards bearing each symbol, may be selected from the dictionary and dealt among the players. The first player lays down a picture of a horse, for example, and says "Match mine". Another player places a picture of a hat upon it, and claims a match. Then each player turns his card over and verifies the fact that each word begins with the same letter, and that the match has been made correctly. If it has, the one who made the match gets the next turn. If no match is made the first player continues to play until some one matches a card. The player first out of cards wins the game. Before each game or before each deal, it should be agreed among the players whether the match shall be of the first sound, the end sound or the middle sound of the words.

It will be obvious that the compiler of a dictionary according to my invention will be almost unlimited in subject matter.

It will also be apparent to those skilled in the art that innumerable educational and entertaining games either for the school room or for social parties can be devised from groups of the cards 2 picked from the file for their related subject matter.

I claim:

1. A loose leaf dictionary file comprising a set of cards bearing literary symbols and definitions other than literary in combination with a second set of cards, each of the second set bearing on its face the same literary symbol as one of the cards of the first named set and on its back a definition other than literary borne by said card of the first named set.

2. A loose leaf dictionary file comprising a set of cards bearing literary symbols and definitions other than literary and adapted to be removably retained in the file, in combination with a set of lose cards, each loose card bearing the same literary symbol and definition as one of the cards of the first named set.

3. A loose leaf dictionary file comprising a set of cards bearing on one face literary symbols and definitions other than literary, and adapted to be removably retained in the file, in combination with a set of cards adapted to be placed loosely in said file, each card of said second set bearing on its face the same literary symbol as one of the cards of the first named set and on its back a definition other than literary borne by said card of the first named set.

4. A loose leaf dictionary file comprising a set of cards bearing literary symbols and definitions other than literary in combination with a second set of cards, each card of the second set bearing a symbol and a definition other than literary borne by one of the cards of the first named set, the cards of the two sets being interspersed.

5. A loose leaf dictionary file comprising a set of cards bearing on one face literary symbols and definitions other than literary, and adapted to be removably retained in the file, in combination with a second set of cards adapted to be placed loosely in said file, each card of said second set bearing on its face a literary symbol, and on its back a definition, borne by one of the cards of the first named set, the cards of the second set being interspersed among the cards of the first set.

6. A loose leaf dictionary file comprising a set of cards bearing literary symbols and definitions other than literary in combination with a second set of cards, each of the second set bearing on its face the same literary symbol as one of the cards of the first named set and on its back a definition other than literary borne by said card of the first named set, the cards of one set being of a different size and contour from those of the other set.

7. A loose leaf dictionary file comprising cards adapted to be removably secured in said file and bearing a literary symbol and a definition thereof, other than literary, in combination with loose cards adapted to be filed between said first named cards, each loose card having on is face a literary symbol similar to that upon one of the first named cards and upon its back a definition, other than literary, appearing upon said first named card.

8. An educational device in the form of a card file comprising a series of cards adapted to be fastened in alphabetic order into said device, each card bearing on its face a literary symbol and a definition other than literary, in combination with a second set of cards adapted to be filed between said first named cards, each card of the second set bearing on its face a literary symbol similar to that upon one of the first named cards, and upon its back a definition, other than literary, appearing upon said first named card, said symbols being such that the cards of the second set are capable of assembly into groups of related significance for game purposes.

9. In an educational game, a set of cards comprising groups of related subject matter, each card having on its face a literary symbol and on its back a definition of said symbol other than literary, in combination with a loose-leaf alphabetical file to receive said cards, and a series of cards secured in alphabetical order in said file, each card of said secured series bearing upon its face a literary symbol and a definition other than literary appearing upon the face and back respectively of one of the first named set of cards.

10. In a loose leaf dictionary file, a set of cards removably secured in said file, each card bearing on its face a literary term and a definition other than literary, in combination with a set of loose cards filed between said secured cards, each loose card bearing on its face a single literary term borne by one of the secured cards, and on its back the same definition other than literary borne by said secured card, certain of the loose cards comprising groups bearing literary symbols of related significance, for the purposes set forth.

In testimony whereof I have signed my name to this specification.

ETHEL B. WARING.